(12) United States Patent
Franssen et al.

(10) Patent No.: US 9,598,273 B2
(45) Date of Patent: Mar. 21, 2017

(54) LIQUID PRESSURE REDUCING UNIT FOR BEVERAGE DISPENSING UNIT

(71) Applicant: Anheuser-Busch InBev SA, Brussels (BE)

(72) Inventors: Stijn Franssen, Brussels (BE); Daniel Peirsman, Brussels (DE)

(73) Assignee: Anheuser-Busch InBev S.A., Brussels (BE)

( * ) Notice: Subject to any disclaimer, the term of this patent is extended or adjusted under 35 U.S.C. 154(b) by 0 days.

(21) Appl. No.: 14/397,174

(22) PCT Filed: Apr. 25, 2013

(86) PCT No.: PCT/EP2013/058640
§ 371 (c)(1),
(2) Date: Oct. 24, 2014

(87) PCT Pub. No.: WO2013/160406
PCT Pub. Date: Oct. 31, 2013

(65) Prior Publication Data
US 2015/0144664 A1 May 28, 2015

(30) Foreign Application Priority Data

Apr. 26, 2012 (EP) ..................................... 12165750

(51) Int. Cl.
*B67D 1/14* (2006.01)
*B29C 45/00* (2006.01)
(Continued)

(52) U.S. Cl.
CPC .......... *B67D 1/1422* (2013.01); *B29C 45/006* (2013.01); *B29C 65/08* (2013.01);
(Continued)

(58) Field of Classification Search
CPC .......... B29C 2045/0067; B29C 45/006; B29C 65/562; B29C 65/58; B29C 66/1222;
(Continued)

(56) References Cited

U.S. PATENT DOCUMENTS

| 5,199,609 A | 4/1993 | Ash, Jr. |
| 5,240,144 A | 8/1993 | Feldman |

(Continued)

FOREIGN PATENT DOCUMENTS

| AU | 2008240331 | 11/2008 |
| CA | 2 579 182 | 8/2008 |

(Continued)

*Primary Examiner* — Frederick C Nicolas
*Assistant Examiner* — Bob Zadeh
(74) *Attorney, Agent, or Firm* — Levy & Grandinetti (57) ABSTRACT

A liquid pressure-reducing unit having a first half body with a contact surface and first groove extending over the contact surface is disclosed. The unit has a flexible resilient sealing element having a floor layer lining the floor of the first groove. The unit has a second half body with a contact surface and first and second walls extending out of the contact surface and defining a second groove. The contact surfaces of the first half body and second half body join, wherein the first and second walls penetrate into the first groove so that the free end of the first and second walls forms a fluid-tight contact with the flexible resilient floor layer lining the floor of the first groove, defining a fluid-tight channel bringing in fluid communication a fluid inlet with a fluid outlet. The channel is non-rectilinear and/or having a cross-section varying over the length thereof.

18 Claims, 7 Drawing Sheets

(51) Int. Cl.
| | | |
|---|---|---|
| *B67D 1/12* | (2006.01) | |
| *B29C 65/08* | (2006.01) | |
| *B29C 65/00* | (2006.01) | |
| *B29D 22/00* | (2006.01) | |
| *B67D 1/04* | (2006.01) | |
| B29L 31/00 | (2006.01) | |
| B29L 31/56 | (2006.01) | |
| B29C 65/48 | (2006.01) | |
| B29C 65/56 | (2006.01) | |
| B29C 65/58 | (2006.01) | |
| B29C 65/60 | (2006.01) | |
| B29C 65/02 | (2006.01) | |

(52) U.S. Cl.
CPC ...... *B29C 66/1222* (2013.01); *B29C 66/1224* (2013.01); *B29C 66/1226* (2013.01); *B29C 66/30223* (2013.01); *B29C 66/54* (2013.01); *B29C 66/55* (2013.01); *B29C 66/73921* (2013.01); *B29D 22/003* (2013.01); *B67D 1/04* (2013.01); *B67D 1/1272* (2013.01); *B29C 65/02* (2013.01); *B29C 65/48* (2013.01); *B29C 65/4895* (2013.01); *B29C 65/562* (2013.01); *B29C 65/58* (2013.01); *B29C 65/60* (2013.01); *B29C 66/124* (2013.01); *B29C 66/545* (2013.01); *B29C 66/71* (2013.01); *B29C 66/8322* (2013.01); *B29K 2995/0046* (2013.01); *B29L 2031/56* (2013.01); *B29L 2031/7506* (2013.01); *Y10T 29/49876* (2015.01); *Y10T 29/49943* (2015.01); *Y10T 29/49963* (2015.01)

(58) Field of Classification Search
CPC ............ B29C 66/12221; B29C 66/124; B29C 66/12441; B29C 66/1248; B29C 66/55; B67D 1/04; B67D 1/1272
See application file for complete search history.

(56) References Cited

U.S. PATENT DOCUMENTS

| | | | |
|---|---|---|---|
| 5,573,145 A | 11/1996 | Groh | |
| 2009/0108031 A1* | 4/2009 | Anderson | B67D 1/0839 222/394 |
| 2010/0326990 A1* | 12/2010 | Mader | A61J 1/1406 220/269 |
| 2011/0135377 A1* | 6/2011 | Teller | A45D 40/00 401/88 |
| 2011/0204016 A1* | 8/2011 | Lee | B65D 53/04 215/329 |
| 2011/0266297 A1* | 11/2011 | Thorpe | B65D 43/166 220/831 |

FOREIGN PATENT DOCUMENTS

| | | |
|---|---|---|
| DE | 102 11 663 | 10/2003 |
| DE | 10 2007 001 215 | 10/2008 |
| EP | 1 088 640 | 4/2001 |
| JP | 4-331879 | 11/1992 |
| JP | 7-217755 | 8/1995 |
| WO | WO 2004/065232 | 8/2004 |
| WO | WO 2006/082486 | 8/2006 |
| WO | WO 2007/019852 | 2/2007 |
| WO | WO 2007/019853 | 2/2007 |

\* cited by examiner

LIQUID PRESSURE REDUCING UNIT FOR BEVERAGE DISPENSING UNIT

This Application is the U.S. National Phase of International Application Number PCT/EP2013/058640 filed on Apr. 25, 2013, which claims priority to European Application Number 12165750.6 filed on Apr. 26, 2012.

FIELD OF THE INVENTION

The present invention relates to the field of dispensing devices for liquids, in particular beverages. It concerns a liquid pressure reducing unit suitable for reducing the pressure of a liquid dispensed from a pressurized container to the ambient atmosphere. It also concerns a method for manufacturing said pressure reducing unit.

BACKGROUND OF THE INVENTION

Figure 1:
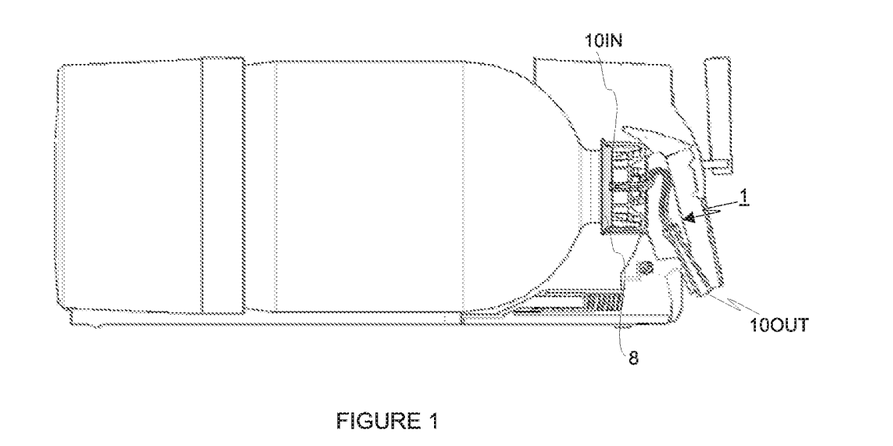
FIG. 1: schematic representation of a dispensing apparatus comprising a pressure reducing unit according to the present invention.

Liquid dispensing devices have been on the market for ages. Many of them rely on a pressurized gas raising the pressure in the interior of a container containing the liquid to be dispensed, in particular a beverage like beer or other carbonated beverages. The gas is either fed directly into the container containing the liquid like e.g., in U.S. Pat. No. 5,199,609 or between an external, rather stiff container and an inner, flexible vessel (e.g., a bag or a flexible bottle) containing the liquid to be dispensed, like in U.S. Pat. No. 5,240,144 (cf. FIGS. 1(a)&(b)). Both applications have their pros and cons which are well known to the persons skilled in the art. The present invention applies equally to both types of delivery systems.

The over pressure applied to the container for driving the liquid out thereof is usually of the order of 0.5 to 1.0 bar (above atmospheric). It is clear that the flow of a liquid reaching the dispensing tap at such high pressure could easily become uncontrollable and such sudden pressure drop could lead to sputter and to the formation of unwanted foam. For this reason, it is often necessary to provide means for substantially reducing the pressure of a liquid being dispensed between the container it is extracted from and the tap, where it contacts atmospheric conditions. Several solutions have been proposed to solve this problem.

The simplest method for inducing pressure losses between the container and the dispensing tap is to provide a long dispensing line, of a length of about 1 to 5 m. This solution is self evident in most pubs, wherein the kegs are stored in a cellar or next room, connected to the tap by a long line. For smaller systems like home dispensers, however, this solution has drawbacks, such as requiring a specific handling for fitting such long line in a dispensing apparatus, usually coiling it. A substantial amount of liquid remains in the line after each dispensing. Said stagnant liquid is the first to flow out of the tap at the next dispense. This of course has the inconvenience that the beverage stored in the dispensing line is not controlled thermally and would result in dispensing e.g., beer at a temperature above the desired serving temperature. A further inconvenient is when changing container, the liquid stored in the line may yield serious hygienic concerns and, in case of a different beverage being mounted on the appliance, to undesired flavours mixing. For solving this latter problem, it has been proposed to change the dispensing line each time the container is being changed (cf. e.g., WO2007/019853, dispensing line 32 in FIGS. 35, 37, and 38).

An alternative to increasing the length of the dispensing line for generating pressure losses in a flowing liquid is to vary the cross-sectional area of the line. For instance, it is proposed in WO2007/019852 to provide dispensing lines comprising at least two sections, a first, upstream section having a cross-sectional area smaller than a second, downstream section. Such line can be manufactured by joining two tubes of different diameter, or by deformation of a polymeric tube, preferably by cold rolling. US2009/0108031 discloses a dispensing line comprising at least three sections of different cross-sectional area forming a venturi tube as illustrated in FIGS. 5 and 9 of said application. The dispensing tube described therein is manufactured by injection moulding two half shells each comprising an open channel with matching geometry to form upon joining thereof a closed channel with the desired venturi geometry. In DE102007001215 a linear tube section at the inlet of a pressure reducing duct transitions smoothly into a tubular spiral with progressively increasing diameter, finishing in an outlet opening.

U.S. Pat. No. 5,573,145 proposes to reduce pressure of an outflowing liquid by inserting in the dispensing line, upstream from the tap, a device for reducing foaming and flowrate of the liquid. Said flow regulating device consists of a mesh rolled up to form a cylinder and acts as a static mixer. A static mixer is actually the solution taught in AU2008/240331 to reduce the pressure of a liquid flowing out of a dispensing apparatus.

An effective but rather expensive and hygienically sensitive solution to reducing the pressure of the flowing liquid is to interpose in the dispensing line a pressure controlling valve between the container and the tap.

The solutions to reducing the pressure of a flowing liquid reviewed supra are all relatively expensive as they all require some degree of assembly. The cost of a dispensing line relative to the volume of beverage dispensed therewith may appear insignificant if it can be used several times, or is to be mounted on a fixed dispensing apparatus. Recently, a market for stand-alone home appliances has been developing rapidly. In particular, some of these appliances are not meant to be reloaded after use with a new container and should be disposed of once the original container is empty. It is clear that the design of such all-in-one, ready-to-use, disposable appliances is severely cost driven, as the cost of the packaging and dispensing mechanism should not unreasonably outweigh the cost of the beverage to be dispensed, and sold in relatively small quantities in a container of a capacity of the order of 1 to 10 l, maybe up to 20 l. Furthermore, recycling of the components of disposable appliances is a problem which cannot be overlooked nowadays. In such small appliances, the pressure reducing tube may have quite a small diameter and preferably comprise a curved shape in order to create pressure losses as the liquid flows through the tube.

Figure 2:
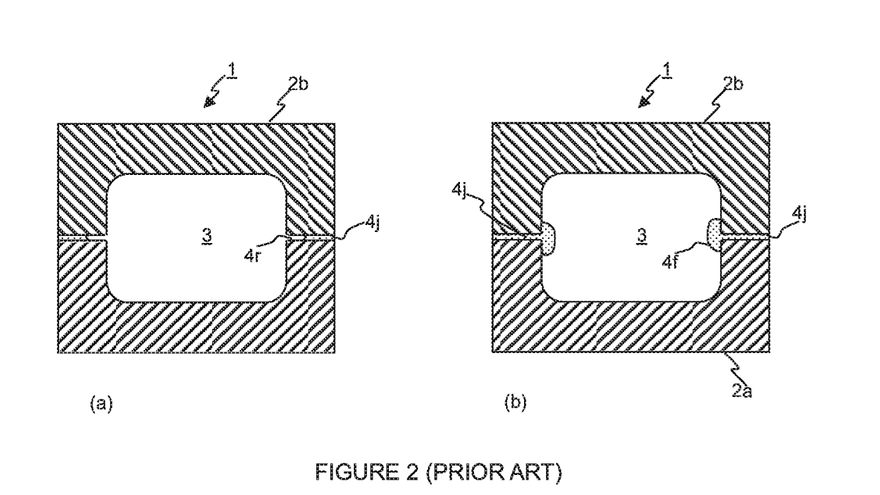
FIG. 2: schematic representation of problems associated with prior art process techniques.

Pressure reducing units comprising a curvilinear channel of small and possible varying cross-section can be produced e.g., by injection moulding a first half shell comprising a first open half channel and a second half shell comprising a second half of channel, matching the first one, and welding the two half shells, with the two half channels in registry, by injection moulding an adhesive at the interface. The adhesive can be the same material of the two half shells, or it may be a different one, such as an elastomer or crosslinking adhesive. Such process is disclosed e.g., in JP7217755, EP1088640, DE10211663, and JP4331879. The channel walls should be smooth and impervious to the liquid to be dispensed. The problem with the foregoing production technique is that it is very difficult to bring just enough welding material to fill the joint between the two half shells to be flush with the channel walls. As illustrated in FIG. 2(a), if there is not enough welding material, a recess (4r) is formed which may substantially change the flow behaviour of the liquid. On the other hand, as illustrated in FIG. 2(b), if too much welding material is injected, it may form a flash (4f) protruding into the channel, locally reducing its cross-section and, in extreme cases, even sealing the passage altogether, in particular for channels of small cross sections.

It therefore remains a need for providing pressure regulating and flow limiting lines in a pressure driven liquid dispensing apparatus which is effective in controlling the pressure and flow rate of a liquid, which can be produced economically and reproducibly.

SUMMARY OF THE INVENTION

The present invention is defined in the appended independent claims. Preferred embodiments are defined in the dependent claims. The present invention provides a liquid pressure reducing unit for bringing in fluid communication with the ambient atmosphere a liquid contained in a pressurized container and for gradually decreasing the pressure of said liquid as it is being dispensed, said unit comprising:
 (a) A first half body comprising a contact surface and a first groove extending over said contact surface;
 (b) A flexible resilient sealing element comprising a floor layer lining the floor of said first groove, and
 (c) A second half body comprising a contact surface and a first and second opposed walls extending over said contact surface and defining a second groove, the contact surface of said second half body being joined to the contact surface of said first half body, wherein the first and second walls penetrate into the first groove such that the free end of said first and second walls form a fluid tight contact with the flexible resilient floor layer lining the floor of said first groove, thus defining a fluid tight channel bringing in fluid communication a fluid inlet with a fluid outlet, said channel being non rectilinear and/or having a cross-section varying over the length thereof.

In a preferred embodiment, the sealing element comprises two opposed flexible walls, jutting out of said floor layer, said flexible walls being oriented towards the opening of said first groove and contacting a surface of the first and second opposed walls of the second half-body. In yet a most preferred embodiment, the height of the first and second flexible walls is larger than the depth of the second groove of the second half body, such that said flexible walls are compressed and strained in order to fit in the channel, thus forming a fluid tight contact. In yet a preferred embodiment, the sealing element comprises at least one tubular portion adjacent an open channel portion.

The flexible material may either be laid or injected into the first groove of the first half body. It may be made of any material having a sufficient elasticity, typically elastomers, thermoplastic elastomer (TPE, EVA, EVOH), nitrile rubber (NBR), rubber, vulcanised elastomers (TPV) silicone polymers, block copolymers such as steryl butadiene elastomers (SBR) or any other thermocured elastomer, and the like. The two half bodies, on the other hand, should be made of a harder material such as PE, PP, PET, PEN, ABS, PC, PA and the like.

The present invention also concerns a process for producing a liquid pressure reducing unit as described supra, comprising the following steps:

(a) Injection moulding a first half body comprising a contact surface and a first groove extending over said contact surface;
 (b) Injection moulding a second half body comprising a contact surface and a first and second opposed walls extending over said contact surface and defining therebetween a second groove;
 (c) Lining the floor of the first groove with a floor layer of a flexible sealing element;
 (d) Positioning the second half body in registry with the first half body (2a), wherein the first and second walls penetrate into the first groove until the free end of said first and second walls form a fluid tight contact with the flexible resilient floor layer lining the floor of said first groove;
 (e) Joining together the contact surfaces of said first and second half bodies to form the housing of said unit enclosing a fluid tight channel bringing in fluid communication a fluid inlet with a fluid outlet, said channel being non rectilinear and/or having a cross-section varying over the length thereof.

In a first embodiment, the sealing element is positioned into the first groove of said first half body prior to joining the second half body thereto. In a second, preferred embodiment, the sealing element is injection moulded over the first groove of said first half body prior to positioning and joining the second half body thereto.

BRIEF DESCRIPTION OF THE FIGURES

For a fuller understanding of the nature of the present invention, reference is made to the following detailed description taken in conjunction with the accompanying drawings which represent.

DETAILED DESCRIPTION OF THE INVENTION

FIG. 1 illustrates a pressure dispensing appliance comprising a container typically used for dispensing beer or other carbonated beverage by increasing the pressure inside the container to a level higher than the atmospheric pressure. Upon opening a valve, the pressure difference between the interior of the container and the atmospheric environment drives the liquid through a dispensing channel and out of an outlet (10OUT). The pressure of the liquid must decrease in the channel between the inlet (10IN) and the outlet (10OUT) thereof from the pressure level in the container and atmospheric pressure. To reduce the sputter of beverage and formation of excessive foam a pressure reducing unit is interposed between the inlet (10IN) and the outlet (10OUT) of the dispensing channel, comprising means for inducing pressure losses in as short a distance as possible. This can be achieved by including curves in the channel and/or by varying the cross-section thereof. Other means include providing the channel with structured walls. In the latter case, care must be taken that the structured walls do not induce excessive formation of foam, for example when dispensing beer.

The production of a pressure reduction unit with curved channel, with a channel of varying cross-section, and/or provided with structured walls cannot be achieved in a single step, and requires the production of two half shells each comprising an open half channel, the two half bodies being then joined together in order to form a channel of desired complex geometry. As reviewed in the BACKGROUND section, JP7217755, EP1088640, DE10211663, and JP4331879 suggest to weld the two half bodies, with the two half channels in registry, by injection moulding an adhesive (4*j*) at the interface. The adhesive (4*j*) can be the same material as the two half bodies, or it may be a different one, such as an elastomer or crosslinking adhesive. As illustrated in FIG. 2, however, this technique does not allow a tight control of the channel (3) geometry, as it is nearly impossible in an industrial process to ensure that the adhesive be flush with the channel walls. It follows that reproducibility of the hydrodynamic conditions upon dispensing cannot be ensured between two different pressure dispensing units (1), depending on whether a flash (4*f*) or a recess (4*r*) is formed at the channel walls at the level of the interface between the two half shells.

Figure 3:
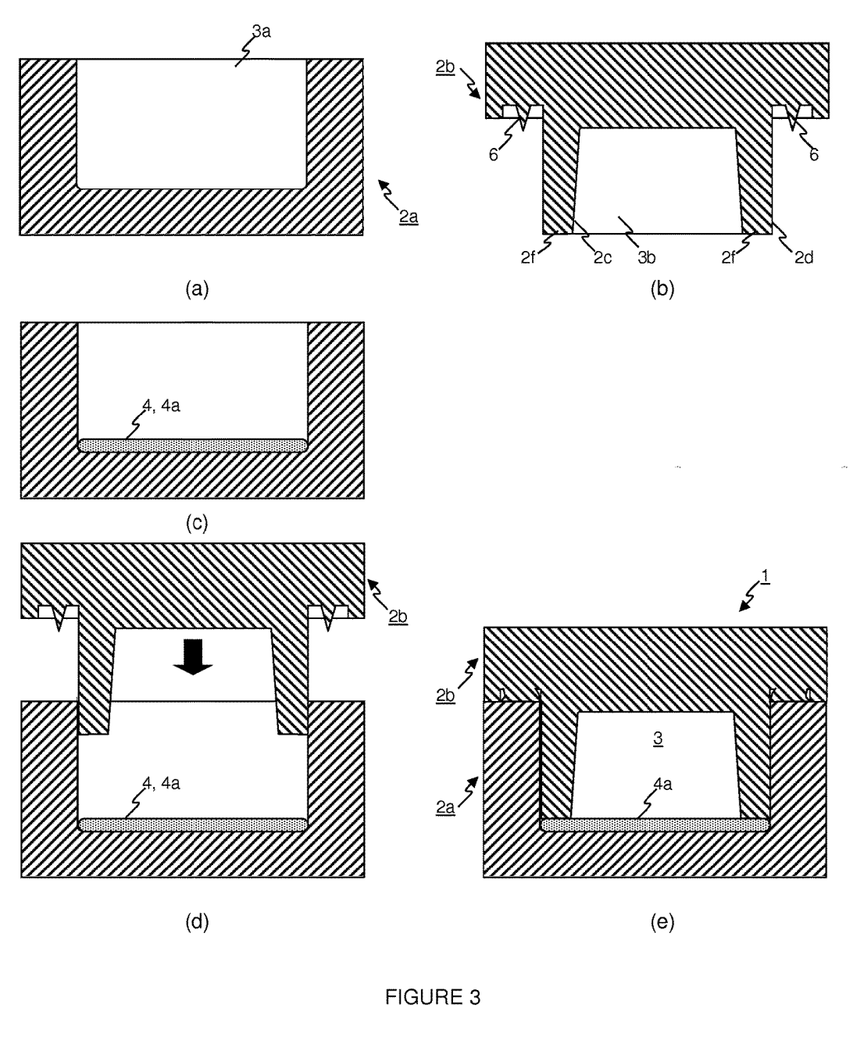
FIG. 3: schematic representation of the various manufacturing steps of a first embodiment of a pressure reducing unit according to the present invention.

The present invention permits to ensure that the channel (3) of a pressure reduction unit (1) produced industrially be controlled and reproducible to ensure consistent dispensing conditions from one dispensing unit to another. As illustrated in cross-section in FIG. 3, in its broadest scope, a liquid pressure reducing unit (1) according to the present invention comprises:

(a) A first half body (2*a*) illustrated in FIG. 3(*a*) comprising a contact surface and a first groove (3*a*) extending over said contact surface and defining the geometry of a portion of the channel (3) of the pressure reducing unit.
 (b) A flexible resilient sealing element (4) comprising a floor layer (4*a*) lining the floor of said first groove (3*a*) (cf. FIG. 3(*c*)), and
 (c) A second half body (2*b*) comprising a contact surface and a first and second opposed walls (2*c*, 2*d*) extending out of said contact surface and defining therebetween a second groove (3*b*), the contact surface of said second half body (2*b*) being joined to the contact surface of said first half body (2*a*), wherein the first and second walls (2*a*, 2*b*) penetrate into the first groove (3*a*) such that the free end (2*f*) of said first and second walls form a fluid tight contact with the flexible resilient floor layer (4*a*) lining the floor of said first groove (3*a*).

A pressure reducing unit according to the present invention therefore allows the formation of a channel of any geometry, comprising curves, cross-section variations and even textured walls, in a very reproducible manner. The channel (3) in FIG. 3 is illustrated with a roughly trapezoidal cross-section. It is clear that any cross section, with curved or straight walls can be achieved with the present invention by designing accordingly the floors of the grooves of the first and second half shells, the inner walls (i.e., facing towards the groove (3*b*)) of the first and second opposed walls (2*c*, 2*d*) of the second half body (2*b*), and the shape of the floor section (4*a*) of the sealing element (4).

Figure 4:
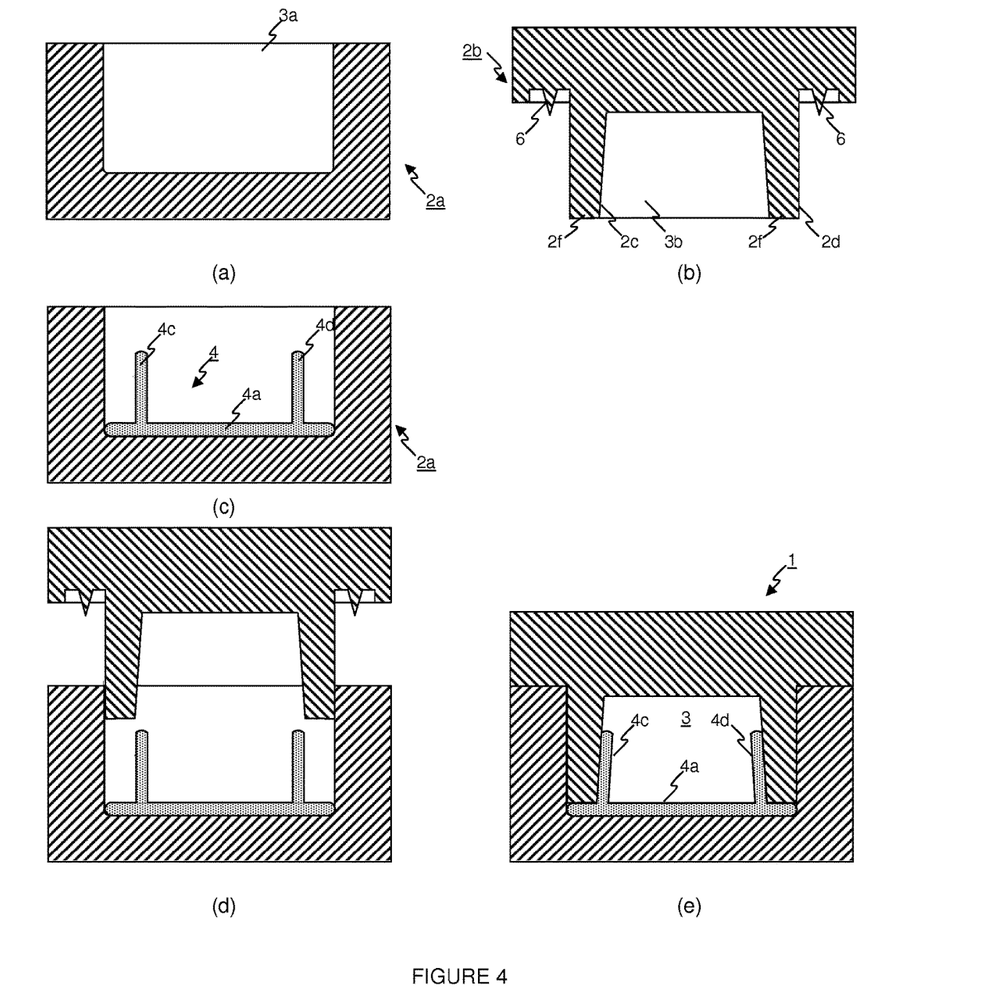
FIG. 4: schematic representation of the various manufacturing steps of a second embodiment of a pressure reducing unit according to the present invention.

In a preferred embodiment illustrated in FIG. 4(*c*), the sealing element (4) comprises two opposed flexible walls (4*c*, 4*d*), jutting out of said floor layer (4*a*), said flexible walls being oriented towards the opening of said first groove and contacting a surface of the first and second opposed walls (2*c*, 2*d*) of the second half-body (2*b*) (cf. FIG. 4(*e*)). It is preferred that the opposed flexible walls (4*c*, 4*d*) contact the inner surface (i.e., facing towards the channel (3, 3*b*) of the corresponding first and second walls (2*c*, 2*d*) of the second half-body (2*b*). The contact between the flexible walls (4*c*, 4*d*) of the flexible walls of the sealing element (4) with the corresponding walls (2*c*; 2*d*) of the second half-body increases the sealing surface between the two half-bodies, thus enhancing the liquid tightness of the channel (3). As can be seen by comparing FIGS. 3 and 4, in the embodiment illustrated in FIG. 3(*e*), in the absence of flexible walls, the sealing element (4) must form a tight contact with the second half-body over the free surfaces (2*f*) only of the first and second opposed walls (2*c*, 2*d*). A defect on the sealing element or on the free surfaces (2*f*) of the first and second opposed walls (2*c*, 2*d*) may lead to a leak. Comparing this with the embodiment of FIG. 4(*e*) reveals immediately that the sealing surface is much larger with the presence of flexible walls than in the absence thereof, thus considerably reducing the risk of formation of a leak. The inner surfaces of the opposed walls (2*c*, 2*d*) of the second half body are preferably tapered, with a lower thickness at their free end (2*f*) than at their basis where they are fixed to the contact surface of the second half-body (2*b*). The flexible walls (4*c*, 4*d*) are preferably substantially parallel to each other and to the direction of insertion of the second half-body into the first half-body (cf. FIG. 4(*d*)). They are advantageously separated at their bases from the side walls of the groove (3*a*) of the first half body (2*a*) by a distance corresponding to the thickness of the free ends (2*f*) of the first and second opposed walls of the second half-body (2*b*). When inserting the second half body (2*b*) into the first half-body, the first and second walls (2*c*, 2*d*) of the second half-body penetrate between the side walls of the first groove (3*a*) and the outer side of the flexible walls (4*c*, 4*d*) of the sealing element. Because of the taper of the second half-body opposed walls (2*c*, 2*d*) the flexible walls (4*c*, 4*d*) are pushed inwards, and apply in response a compressive force onto the walls (2*c*, 2*d*) of the second half-body, thus ensuring a liquid tight contact between the two. To facilitate the insertion of the second half-body into the first half-body, the outer surfaces of the opposed walls (2*c*, 2*d*) of the second half body are preferably tapered too.

Figure 5:
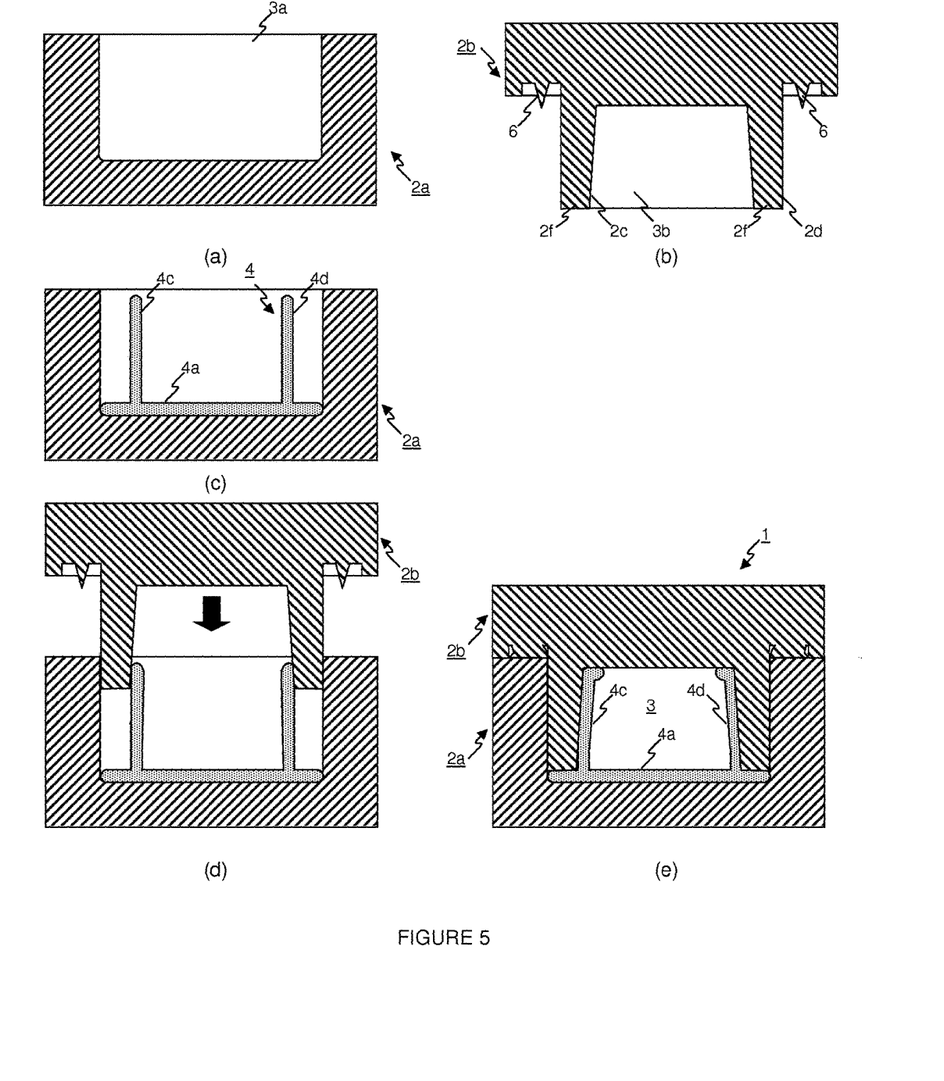
FIG. 5: schematic representation of the various manufacturing steps of a third embodiment of a pressure reducing unit according to the present invention
Figure 6:
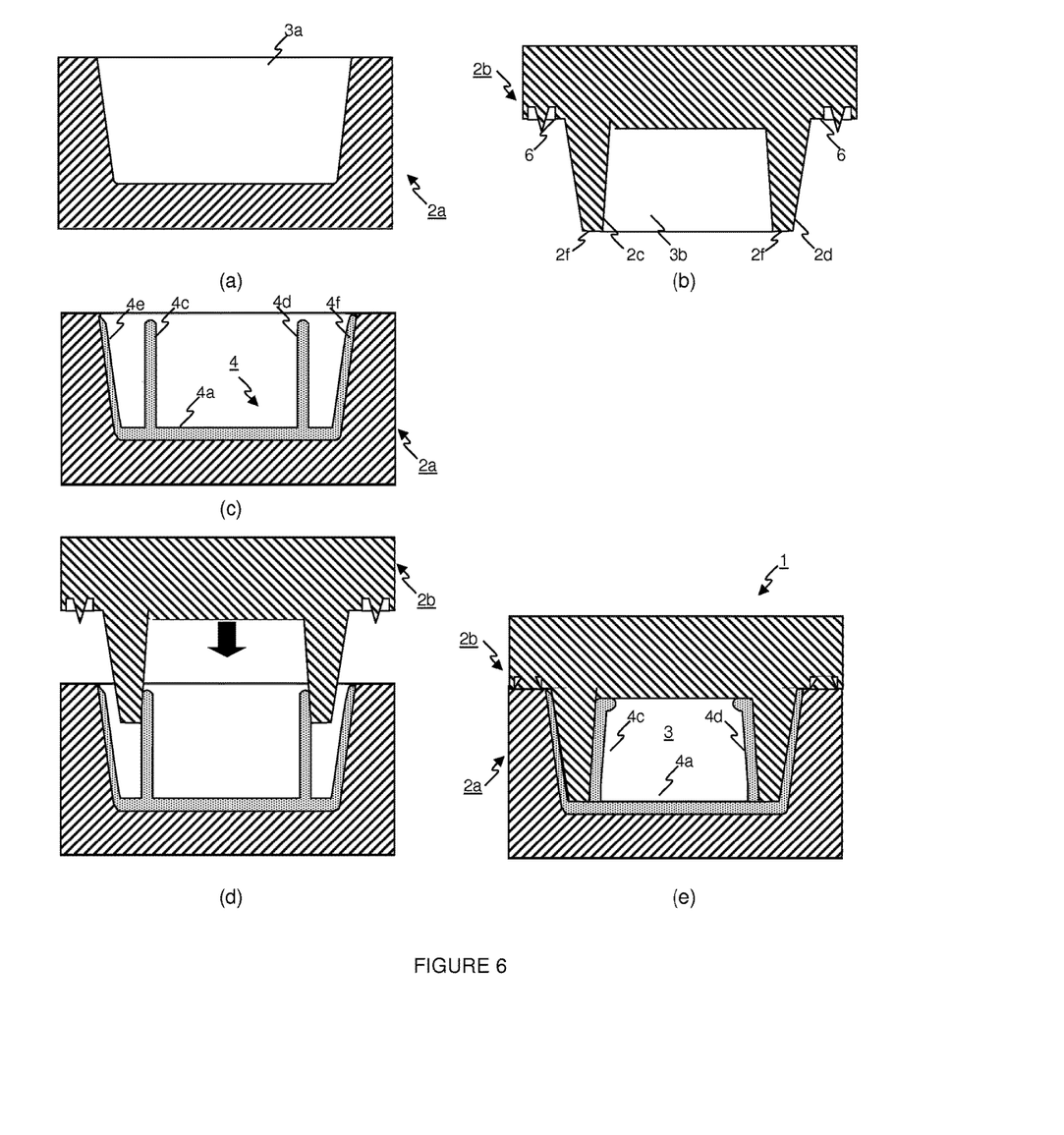
FIG. 6: schematic representation of the various manufacturing steps of a fourth embodiment of a pressure reducing unit according to the present invention

In order to further increase the compression force of the flexible walls (4*c*, 4*d*) of the sealing element (4) onto the walls of the second groove (3*b*) of the second half-body (2*b*), it is preferred that the height of the first and second flexible walls (4*c*, 4*d*) be larger than the depth of the second groove (3*b*) of the second half body (2*b*), such that said flexible walls are compressed and strained in order to fit in the channel (3), thus forming a fluid tight contact. This embodiment is illustrated in FIG. 5(*e*), wherein the flexible walls (4*c*, 4*d*) are strained inwards by the taper of the opposed walls (2*c*, 2*d*) of the second half-body, and also by the ceiling of the second groove (3*b*) thereof which presses on the flexible walls (4*c*, 4*d*) which are higher than the opposed walls (2*c*, 2*d*). As illustrated in FIG. 6 the side walls of the first groove (3*a*) of the first half-body may also be lined with sealing elements (4*e*, 4*f*). The opposed walls (2*c*, 2*d*) are therefore engaged into a gap lined by sealing element (4) formed by the outer surfaces of each flexible wall (4*c*, 4*d*), the sealing elements (4*e*, 4*f*) lining the corresponding wall of the first groove (3*a*) and the portion of floor (4*a*) comprised between these two.

The flexible material (4) is preferably either laid or injected into the first groove (3*a*) of the first half body (2*a*). Injecting the sealing element directly into the first groove certainly has an advantage in terms of supply and stock management of the different components required for the production of the pressure reducing unit. The sealing element (4) may be made of any elastomer suitable for the application. Since the sealing element contacts the beverage, for applications comprising the dispensing of a beverage, the sealing element should fulfil the national food and beverage regulations in force in the countries of use. In particular, the sealing element (4) imay be made of a thermoplastic elastomer (TPE, EVA, EVOH), a nitrile rubber (NBR), vulcanised elastomers (TPV), silicone polymers. Other rubbers like, co-block polymers (like SBR steryl butadiene rubbers), thermo-cured elastomers can also be used. The first and second half bodies must be made of a more rigid material, and can be made of any of PE, PP, PET, PEN, ABS, PC, PA, all polymers which are easy to injection mould.

A pressure reducing unit according to the present invention can be produced with the following steps:
  (a) Injection moulding a first half body (2*a*) comprising a contact surface and a first groove (3*a*) extending over said contact surface;
  (b) Injection moulding a second half body (2*b*) comprising a contact surface and a first and second opposed walls (2*c*, 2*d*) extending over said contact surface and defining a second groove (3*b*);
  (c) Lining the floor of the first groove (3*a*) with a floor layer (4*a*) of a resilient, flexible sealing element (4);
  (d) Positioning the second half body (2*b*) in registry with the first half body (2*a*), wherein the first and second walls (2*c*, 2*d*) penetrate into the first groove (3*a*) until the free end (2*f*) of said first and second walls form a fluid tight contact with the flexible resilient floor layer (4*a*) lining the floor of said first groove (3*a*);
  (e) Joining together the contact surfaces of said first and second half bodies (2*a*, 2*b*) to form the housing of said unit enclosing a fluid tight channel (3) bringing in fluid communication a fluid inlet (10IN) with a fluid outlet (10OUT), said channel (3) being non rectilinear and/or having a cross-section varying over the length thereof.

The sealing element (4) can be produced separately and then positioned into the first groove (3*a*) of said first half body (2*a*) prior to joining the second half body (2*b*) thereto. It is preferred, however, to injection mould the sealing element (4) directly over the first groove (3*a*) of said first half body (2*a*) prior to positioning and joining the second half body (2*b*) thereto. As discussed above, the sealing element (4) preferably comprises first and second flexible walls (4*c*, 4*d*), more preferably of height larger than the height of the first and second walls (2*c*, 2*d*) of the second half-body (2*b*) (cf. FIGS. 4&5). As illustrated in FIG. 6, the sealing element (4) may also line the side walls of the first groove (3*a*). The first and second half-bodies may be joined to one another by any joining means known in the art, such as gluing, solvent welding, heat welding, ultrasonic welding, or with mechanical fastening means, such as snap fittings, screws, rivets, and the like. It is preferred to use ultrasonic welding. For this technique, it is advantageous to provide one of the half-bodies (2*a*, 2*b*) with sharp protrusions (6) extending along the line of welding in order to locally concentrate the ultrasonic energy onto the welding line.

Figure 7:
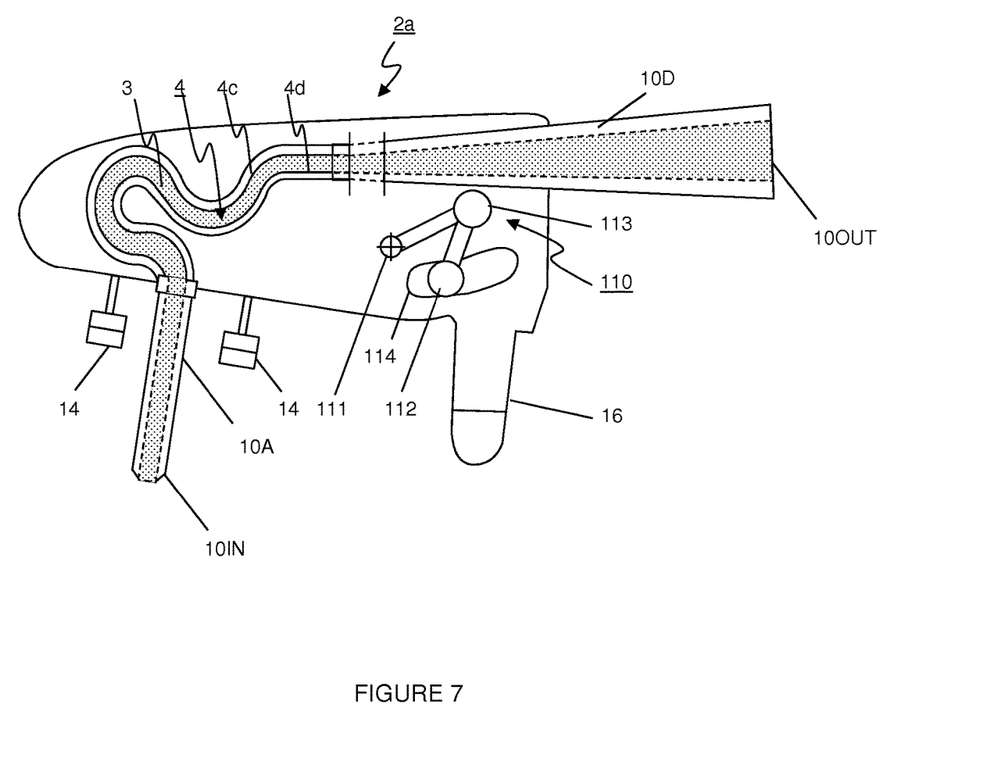
FIG. 7: schematic representation of an embodiment of a pressure reducing unit according to the present invention.
Figure 8:
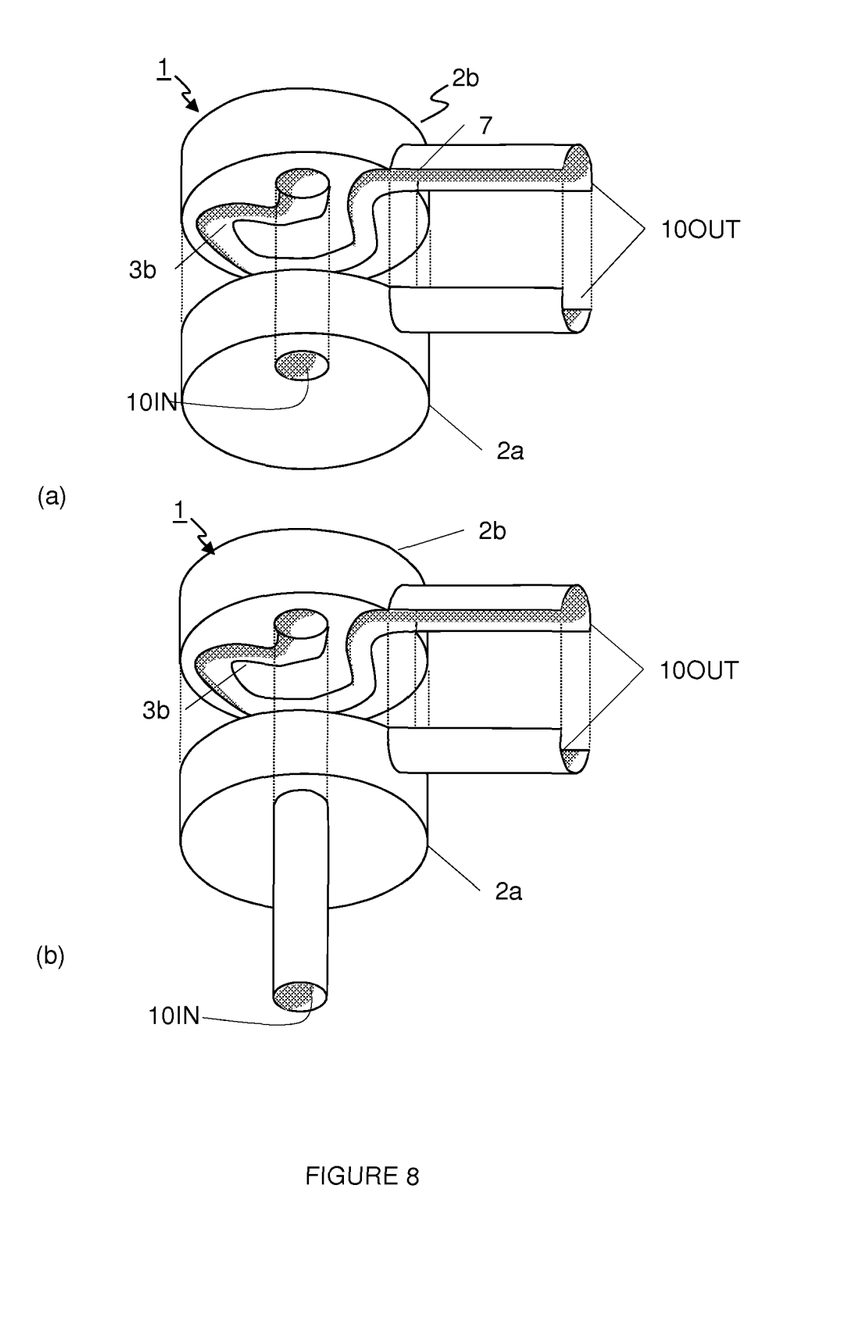

FIG. 7 illustrates one embodiment of pressure reducing unit (1) which can be mounted onto a container as shown in FIG. 1. Two half bodies (2*a*, 2*b*) (only half body (2*a*) is shown in FIG. 7) form a cartridge partially encasing a sinusoidal dispensing channel (3) extending from an inlet (10IN) to an outlet (10OUT). In order to prevent excessive formation of foam, the channel preferably comprises no sharp angle. The inlet end (10IN) and outlet end (10OUT) protrude out of a first and second sides, respectively of said cartridge. The inlet end (10IN) is part of a hard tube able to penetrate into a corresponding opening of the closure (8) of a container. The outlet end (10OUT), on the other hand, is part of a flexible, resilient tube (10D) preferably made of the same material as the sealing material and is advantageously an integral part thereof. The portion of the channel comprised within the cartridge, between the inlet tube (10A) and the outlet tube (10D) comprises the pressure reducing channel portion (3), with curves, cross-section variations and/or structured wall surfaces to decrease the fluid pressure of the liquid flowing therethrough. When the cartridge is engaged into the receiving system of a dispensing unit as illustrated in FIG. 1, the flexible portion (10D) of the dispensing tube is engaged between the pinching members of a pinch valve system; and the inlet (10IN) is engaged into a dispensing opening located in the closure (8) of the container positioned in said dispensing unit, to bring the dispensing channel (3) in fluid communication with the liquid to be dispensed container inside the container.

For safety reasons upon handling the pressure reducing unit, it is possible to provide the cartridge with a secondary pinch valve (110) formed by a squeezing means (113) which is naturally biased so as to squeeze the flexible portion (10D) of the dispensing tube encased in the cartridge (1). Upon insertion of the cartridge (1) into the receiving portion of a dispensing unit, a pin (112) is activated which releases the pressure of the squeezing member (113) from the flexible tube (10D). This embodiment is very advantageous in case the dispensing opening of the closure (8) is permanently unsealed upon introduction therethrough of the dispensing tube inlet (10IN). When removing the container from the appliance, even if the conainer is not empty, the cartridge remains fixed to the closure, and the opening is sealed by the secondary pinch valve (110). The removed container can thus be stored and mounted again into the appliance when desired. The secondary pinch valve (110) cannot, once engaged in the receiving system, be actuated from the outside of the appliance. In this embodiment, it is preferred if the cartridge comprises snap fitting means (14) for fixing the cartridge to the closure. The cartridge also preferably comprises gripping means (16) for releasably fixing the cartridge to mating gripping means of the receiving system of the dispensing unit. If, on the other hand, the opening (10A) can be sealed back after removal of the dispensing tube inlet (10IN), then a secondary pinch valve (110) and snap fitting means (14) are not necessary anymore.

The flexible portion (10D) of the dispensing tube preferably has a tubular shape, and is preferably an integral part of the sealing element (4) lining the first half-body (2*a*). Similarly, the inlet tube (10A), which unlike the flexible portion (10D) should be rigid to penetrate into a dispensing opening of a closure (8) of a container, can also advantageously be in a tubular shape. The sealing element can therefore be applied only in the first sinusoidal groove section (3*a*) comprised between the inlet tube (10A) and the flexible outlet tube (10D), the latter preferably being an integral part of the sealing element.

A pressure reducing unit (1) as illustrated in FIG. 7 can be produced by:

(a) Injection moulding a first half body (2*a*) as represented in FIG. 7, comprising a contact surface, a first groove (3*a*) extending over said contact surface, and a hollow inlet tube (10A) bringing in fluid communication one end of said first groove (3*a*) with an inlet (101N);

(b) Injection moulding a second half body (2*b*) (not shown) comprising a contact surface and a first and second opposed walls (2*c*, 2*d*) extending over said contact surface and defining a second groove (3*b*), and further comprising a sharp tipped line (6) extending on said contact surface along each side of the second groove (3*b*), (c) Injection moulding directly into the first groove (3*a*) a flexible sealing element (4), which lines the floor of the first groove (3*a*), optionally the side walls thereof, and which comprises first and second flexible walls (4*c*, 4*d*) defining a half-channel; at one end thereof, the flexible sealing element surrounds the bore of the inlet tube (10IN) and at the other end it forms a tube (10D) protruding out of the half-body, (d) Positioning the second half body (2*b*) in registry with the first half body (2*a*), wherein the first and second walls (2*c*, 2*d*) of the second half body penetrate into the space comprised between the first and second flexible first walls (4*c*, 4*d*) of the sealing element and the adjacent side walls of groove (3*a*) until the inner surfaces and free ends (2*f*) of said first and second walls form a fluid tight contact with the flexible walls (4*c*, 4*d*) and floor layer (4*a*) lining the floor of said first groove (3*a*);

(e) Joining together the contact surfaces of said first and second half bodies (2*a*, 2*b*) to form the cartridge of said unit enclosing a fluid tight channel (3) bringing in fluid communication a fluid inlet (10IN) with a fluid outlet (10OUT), until the sharp tipped lines (6) of the second half-body contact the contact surface of the first half-body (2*a*), (f) Applying ultrasonic energy to the sharp tipped lines (6) to locally melt the material and press to form a strong bond between the first and second half-bodies (2*a*, 2*b*).

A pressure reducing unit according to the present invention is particularly advantageous for use with dispensing apparatuses of relatively small size, corresponding for example to home appliances. For hygienic reasons, unless thoroughly cleaned after use, such units must not be re-used with a new container and must therefore be produced in high volumes and at a low cost The pressure reducing unit (1) of the present invention is very advantageous because cost effective to produce, in a reliable and reproducible manner, allowing a high quality for a high volume commodity product.

The invention claimed is:

1. A liquid pressure reducing unit for bringing in fluid communication with the ambient atmosphere a liquid contained in a pressurized container and for gradually decreasing the pressure of the liquid as the liquid is being dispensed, the unit comprising:

(a) a first half body comprising a contact surface and a first groove extending over the contact surface;

(b) a flexible resilient sealing element comprising a floor layer lining a floor of the first groove; and (c) a second half body comprising a contact surface and a first and second opposed walls extending out of the contact surface and defining therebetween a second groove, the contact surface of the second half body is joined to the contact surface of the first half body, wherein the first and second opposed walls penetrate into the first groove such that a free end of each of the first and second opposed walls form a fluid-tight contact with the flexible resilient sealing element floor layer lining the floor of the first groove, thus defining a fluid-tight channel bringing in fluid communication a fluid inlet with a fluid outlet, the channel being non-rectilinear and/or having a cross-section varying over the length thereof.

2. The liquid pressure reducing unit according to claim 1, wherein the flexible resilient sealing element comprises two opposed flexible walls, jutting out of the floor layer, the two opposed flexible walls are oriented towards an opening of the first groove and contacting a surface of the first and second opposed walls of the second half-body.

3. The liquid pressure reducing unit according to claim 2, wherein an outer surface of each of the first and second opposed walls of the second half body closely mates an internal surface of two side walls defining the first groove and the internal surface of each of the first and second opposed walls of the second half body closely mates the two opposed flexible walls.

4. The liquid pressure reducing unit according to claim 3, wherein the height of the two opposed flexible walls is larger than the depth of the second groove of the second half body, such that the two opposed flexible walls are compressed and strained in order to fit in the channel, thus forming a fluid-tight contact.

5. The liquid pressure reducing unit according to claim 4, wherein the flexible material of the flexible resilient sealing element is either laid or injected into the first groove of the first half body.

6. The liquid pressure reducing unit according to claim 5, wherein the flexible resilient sealing element is made of thermoplastic elastomer (TPE, EVA, EVOH), nitrile rubber (NBR), vulcanised elastomers (TPV), silicone polymers, other rubber-like, co-block polymers (like SBR steryl butadiene rubbers), thermo-cured elastomers.

7. The liquid pressure reducing unit according to claim 6, wherein the first and second half bodies are made of any of PE, PP, PET, PEN, ABS, PC, PA.

8. The liquid pressure reducing unit according to claim 7, wherein the flexible resilient sealing element comprises at least one tubular portion adjacent an open channel portion.

9. A dispensing unit for dispensing a liquid contained in a container the dispensing unit comprising a receiving surface for receiving a container, and a pressure-reducing unit according to claim 1.

10. The liquid pressure reducing unit according to claim 1, wherein the flexible material of the flexible resilient sealing element is either laid or injected into the first groove of the first half body.

11. The liquid pressure reducing unit according to claim 1, wherein the flexible resilient sealing element is made of thermoplastic elastomer (TPE, EVA, EVOH), nitrile rubber (NBR), vulcanised elastomers (TPV), silicone polymers, other rubber-like, co-block polymers (like SBR steryl butadiene rubbers), thermo-cured elastomers.

12. The liquid pressure reducing unit according to claim 1, wherein the two half bodies are made of any of PE, PP, PET, PEN, ABS, PC, PA.

13. The liquid pressure reducing unit according to claim 1, wherein the flexible resilient sealing element comprises at least one tubular portion adjacent an open channel portion.

14. A process for producing a liquid pressure reducing unit, comprising the following steps:
   (a) injection moulding a first half body comprising a contact surface and a first groove extending over said contact surface;
   (b) injection moulding a second half body comprising a contact surface and a first and second opposed walls extending over said contact surface and defining therebetween a second groove;
   (c) lining a floor of the first groove with a floor layer of a flexible resilient sealing element;
   (d) positioning the second half body in registry with the first half body, wherein the first and second opposed walls of the second half body penetrate into the first groove until a free end of each of the first and second opposed walls form a fluid-tight contact with the flexible resilient sealing element floor layer lining the floor of said first groove;
   (e) joining together the contact surfaces of the first and second half bodies to form a housing of the unit enclosing a fluid-tight channel bringing in fluid communication a fluid inlet with a fluid outlet, the channel being non-rectilinear and/or having a cross-section varying over the length thereof.

15. The process according to claim 14, wherein the flexible resilient sealing element is positioned into the first groove of the first half body prior to joining the second half body thereto.

16. The process according to claim 14, wherein the flexible resilient sealing element is injection moulded over the first groove of the first half body prior to positioning and joining the second half body thereto.

17. The process according to claim 16 wherein the liquid pressure reducing unit comprises:
   (a) a first half body comprising a contact surface and a first groove extending over the contact surface;
   (b) a flexible resilient sealing element comprising a floor layer lining the floor of the first groove; and
   (c) a second half body comprising a contact surface and a first and second opposed walls extending out of the contact surface and defining therebetween a second groove, the contact surface of the second half body is joined to the contact surface of the first half body wherein the first and second opposed walls penetrate into the first groove such that a free end of each of the first and second opposed walls form a fluid-tight contact with the flexible resilient sealing element floor layer lining the floor of the first groove, thus defining a fluid-tight channel bringing in fluid communication a fluid inlet with a fluid outlet said channel being non-rectilinear and/or having a cross-section varying over the length thereof;
   wherein the flexible resilient sealing element comprises two opposed flexible walls jutting out of the floor layer, the two opposed flexible walls are oriented towards an opening of the first groove and contacting a surface of the first and second opposed walls of the second half-body;
   wherein an outer surface of the first and second opposed walls of the second half body closely mates an internal surface of two side walls defining the first groove and the internal surface of each of the first and second opposed walls of the second half body closely mates the two opposed flexible walls; and
   wherein the height of the two opposed flexible walls is larger than the depth of the second groove of the second half body, such that the two opposed flexible walls are compressed and strained in order to fit in the channel, thus forming a fluid-tight contact.

18. The process according to claim 17 wherein joining of the first and second half-bodies is carried out by gluing, solvent welding, thermal welding, ultrasonic welding, and/or with mechanical fastening means, such as snap fitting means, screws, rivets.

* * * * *